United States Patent [19]
Wyatt

[11] Patent Number: 5,698,110
[45] Date of Patent: Dec. 16, 1997

[54] PROCESS FOR TREATMENT OF ANIMAL EXCREMENT

[75] Inventor: Danny R. Wyatt, Carthage, Mo.

[73] Assignee: Agricultural Waste Management, Inc., Carthage, Mo.

[21] Appl. No.: 667,142

[22] Filed: Jun. 20, 1996

Related U.S. Application Data

[63] Continuation of Ser. No. 512,569, Aug. 8, 1995, abandoned.

[51] Int. Cl.$^6$ ..................................................... C02F 11/14
[52] U.S. Cl. .......................... 210/751; 210/768; 210/770
[58] Field of Search ............................. 210/768, 770, 210/751

[56] References Cited

U.S. PATENT DOCUMENTS

| | | |
|---|---|---|
| 125,074 | 3/1872 | Parish . |
| 125,927 | 4/1872 | Black . |
| 229,955 | 7/1880 | Chambers . |
| D. 267,264 | 12/1982 | Wacker .................... D23/2 |
| 283,308 | 8/1883 | Wells . |
| 686,744 | 11/1901 | Lipps . |
| 838,036 | 12/1906 | Luckey . |
| 943,668 | 12/1909 | Ellis . |
| 1,045,130 | 11/1912 | Doolittle . |
| 1,320,701 | 11/1919 | Manns . |
| 1,369,871 | 3/1921 | Zirwas et al. . |
| 1,810,239 | 6/1931 | Doolittle . |
| 1,894,496 | 7/1933 | Pickett . |
| 2,558,942 | 7/1951 | Eagleson ....................... 167/30 |
| 2,750,269 | 6/1956 | Klein ............................... 71/21 |
| 2,767,072 | 10/1956 | Coanda ............................ 71/7 |
| 3,097,625 | 7/1963 | Sievers ............................ 119/15 |
| 3,119,373 | 1/1964 | Schmid ........................... 119/28 |
| 3,138,449 | 6/1964 | Renfro ............................. 71/24 |
| 3,223,070 | 12/1965 | Gribble et al. ................. 119/16 |
| 3,859,962 | 1/1975 | Kissinger, Jr. ................. 119/28 |
| 3,877,920 | 4/1975 | Carlberg .......................... 71/21 |
| 4,008,689 | 2/1977 | Albers ............................. 119/28 |
| 4,193,873 | 3/1980 | Thrasher ....................... 210/170 |
| 4,201,564 | 5/1980 | Kauzal ............................. 71/20 |
| 4,208,279 | 6/1980 | Varani ............................ 210/12 |
| 4,607,594 | 8/1986 | Thacker ........................... 119/1 |
| 5,385,673 | 1/1995 | Fergen .......................... 210/751 |
| 5,429,750 | 7/1995 | Steele ........................... 210/751 |

OTHER PUBLICATIONS

Chemical Engineers's Handbook, Fifth Ed., McGraw–Hill Book Co. p. 21.

*Primary Examiner*—Neil McCarthy
*Attorney, Agent, or Firm*—Senniger, Powers, Leavitt & Roedel

[57] ABSTRACT

A process and composition for the treatment of animal excrement that has collected in an enclosure housing animals is disclosed. The process includes the steps of flushing the enclosure to produce a stream containing water and suspended particulate excrement and passing the stream through a filtration system comprising at least one filter having a filter medium for trapping substantially all of the solid animal excrement and filtering liquid from the excrement to produce an animal excrement mixture containing the solid animal excrement and the filter medium. A deodorizing composition is mixed into this animal excrement mixture. The deodorizing composition contains about 5 percent to about 90 percent by weight of lime, and about 10 percent to about 95 percent by weight of cellulose. The deodorizing composition is mixed with animal excrement mixture in a relative proportion of about 1 to 20 parts by weight animal excrement mixture to about 1 part by weight deodorizing composition. The treated animal excrement mixture is dried and removed for use as fertilizer after a period of time.

14 Claims, 3 Drawing Sheets

PROCESS FOR TREATMENT OF ANIMAL EXCREMENT

This is a continuation of application Ser. No. 08/512,569, filed Aug. 8, 1995 abandoned.

BRIEF SUMMARY OF THE INVENTION

This invention relates generally to processes and compositions for the treatment of animal excrement, and more particularly to a novel process and a composition for the treatment of excrement that produces fertilizer in a relatively timely manner.

For a typical livestock operation (e.g., a dairy farm), the American Society of Agricultural Engineers reports that approximately 1.32 cubic feet (9.9 gallons) of waste products is excreted per day per head of dairy cattle (assuming a 1000 lb. dairy cow). Of that, approximately 12.7% is relatively high-density solid material and the balance is fluids. Thus for sanitary and production reasons, the livestock holding area is cleaned several times daily to remove the animals' excrement from the floor by washing the floor with water. The floor of such a holding area is typically constructed with a network of troughs that capture the water and excrement and lead it into a pit outside of or underneath the building. Examples of buildings having this type of configuration for removing animal excrement from a building may be found in U.S. Pat. Nos. 3,097,625, 3,223,070, 3,859,962 and 4,208,279.

It is common to filter and treat the captured excrement to produce fertilizer. One process for forming fertilizer is to compost the filtered excrement by heaping it in a field in long rows ("winrows"). Straw or sawdust may then be laid on the excrement for absorbing its moisture. Periodically, the row is tilled and more straw is laid on the excrement to oxygenate and further remove water from the excrement. In about eight weeks, a sufficient amount of water has been extracted from the excrement so that it may be sold as fertilizer. Although this method for producing fertilizer serves its intended purpose, the length of time to produce fertilizer is excessive. Furthermore, most of the nitrogen in the excrement (which is beneficial for the soil) has been extracted by this process due to the water reacting with the nitrogen in the excrement during the drying of the rows thereby forming anhydrous ammonia, which escapes as gas. Typically, nitrogen loss is approximately 92.5% with this process. Another drawback is the emission of foul odor from the rows of manure and lagoon. Filters used to trap the solid excrement from the flushing water only remove approximately 45%-50% of the solids from the excrement with the remainder typically being routed to the lagoon where the relatively high proportion of solid excrement in the flushing water tends to cause odor problems. The high portion of solids in the flushing water further effectively eliminates the option of routing the flushing water to a holding tank since the solids would periodically have to be pumped out at a not inconsequential expense.

Accordingly, among the several objects of the present invention is that of an improved process for the treatment of excrement which substantially decreases the dehydration time; the provision of such an improved process which increases the amount of minerals beneficial to the soil retained in the fertilizer; the provision of such an improved process which substantially deodorizes the manure during the drying process; the provision of such an improved process which removes substantially all of the solid excrement from the flushing water to produce a relatively clean and substantially deodorized filtrate; the provision of such an improved process which enables the use of holding tank as opposed to a lagoon for a more sealed system; and the provision of such an improved process which is easy and economical to implement. Also among the several objects of the present invention is that of an improved composition for treating animal excrement which, after being mixed with the excrement, produces a fertilizer especially beneficial to soil; the provision of such a composition which is fire resistant in storage; and the provision of such a composition which is easy to produce.

Briefly, therefore, the process for the treatment of animal excrement of the present invention comprises the steps of providing a drainage system and a filtration system in an enclosure housing animals in which excrement excreted by the animals is captured by the drainage system and transferred to the filtration system. The filtration system comprises a filter for filtering liquid from the excrement and trapping solid excrement and a storage area for holding the solid animal excrement trapped in the filter. A composition is mixed into the solid excrement in the storage area and comprises about 5 percent to about 90 percent by weight of lime, and about 10 percent to about 95 percent by weight of cellulose. The composition is mixed with animal excrement in a relative proportion of about 1 to 20 parts by weight animal excrement to about 1 part by weight composition. The treated animal excrement is removed from the storage area for use as fertilizer after a period of time.

In another aspect of the invention, a mixture for use as fertilizer comprises a deodorizing composition and animal excrement in a relative proportion of about 1 to 20 parts by weight animal excrement to about 1 part by weight composition. The dehydrating composition contains about 5 percent to about 90 percent by weight of lime, and about 10 percent to about 95 percent by weight of cellulose.

In a third aspect of the invention, a composition for treating animal excrement comprises about 5 percent to about 90 percent by weight of lime, and about 10 percent to about 95 percent by weight of cellulose.

Other objects and features will be in part apparent and in part pointed out hereinafter.

BRIEF DESCRIPTION OF THE DRAWINGS

Corresponding parts are designated by corresponding reference numerals in the several views of the drawings.

DETAILED DESCRIPTION OF THE PREFERRED EMBODIMENT

Figure 1:
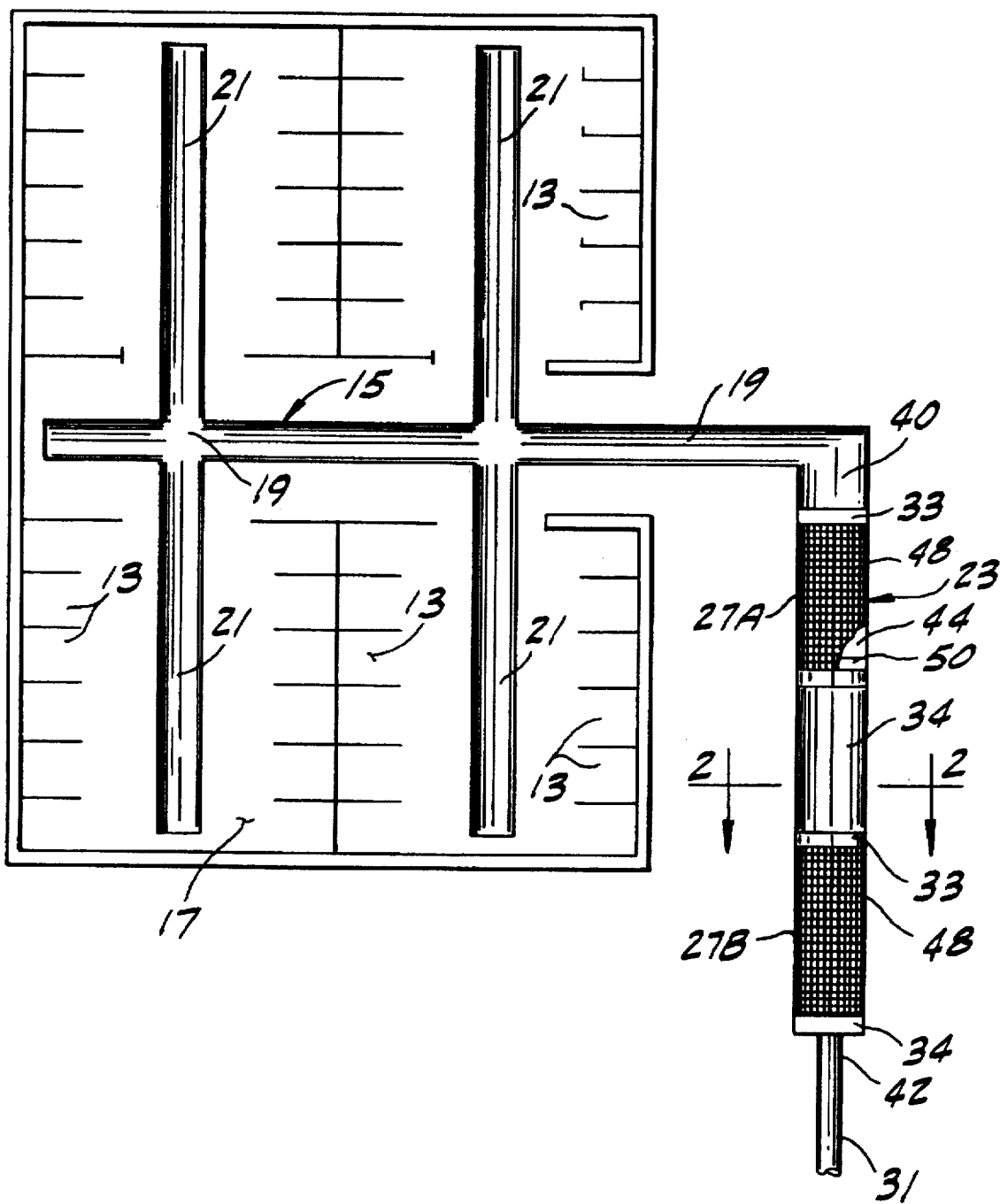
FIG. 1 is a top plan schematic of an enclosure having animals having a drainage system and a filtration system of the present invention.
Figure 2:
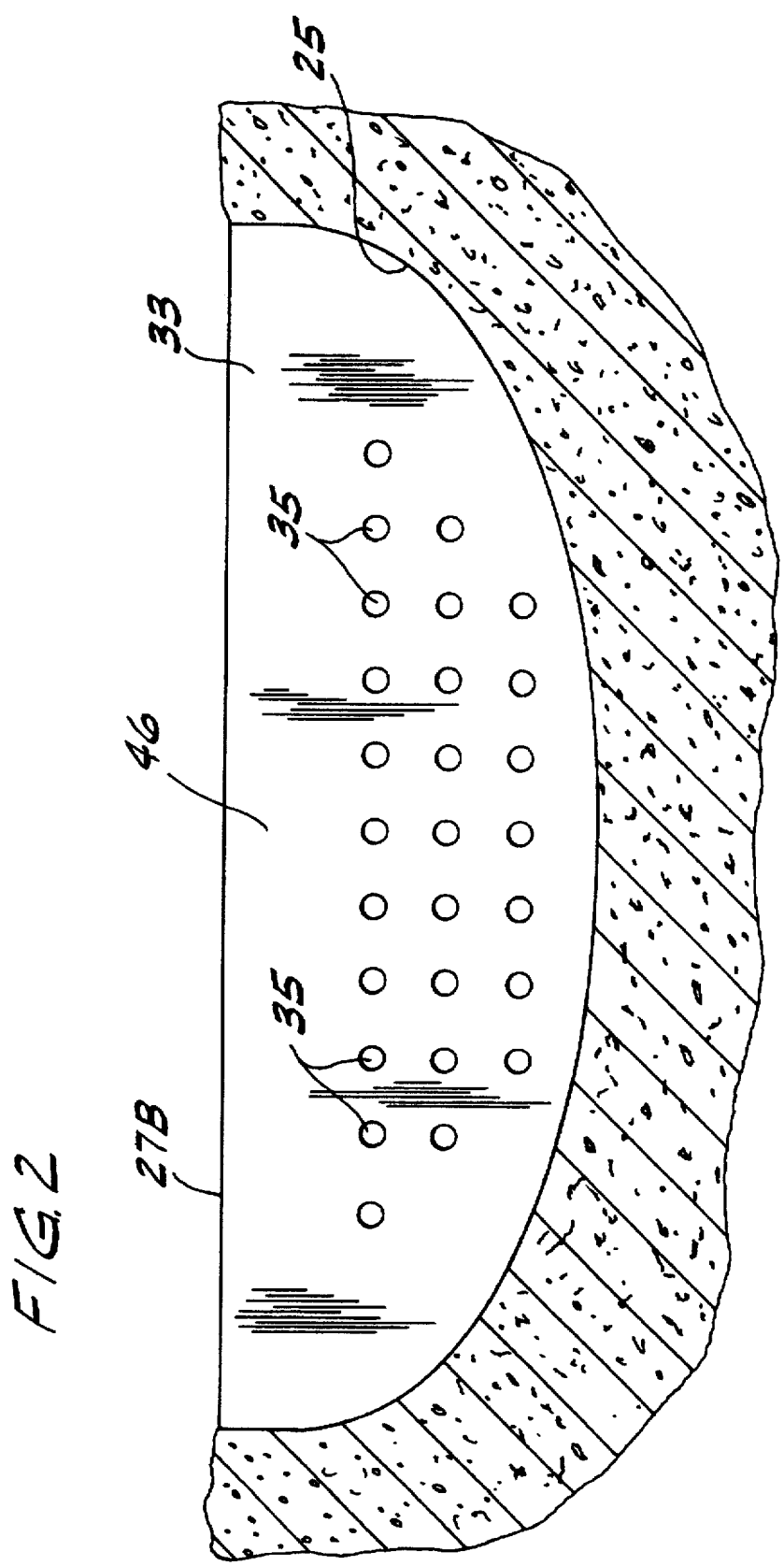
FIG. 2 is a cross section taken along line 2—2 of FIG. 1 showing a filter assembly of the present invention.

Referring now to the drawings, and more particularly to FIG. 1, a building for holding livestock, such as a dairy barn, is generally indicated at 11. The process of the present invention for treating solid excrement of the livestock to produce fertilizer comprises the steps of providing a drainage system, generally designated 15, and a filtration system 23 in the dairy barn 11 so that excrement excreted by the animals is washed by flushing water to produce a stream containing water and suspended particulate excrement, the flushing water is captured by the drainage system and routed to the filtration system where it is passes therethrough. The filtration system comprises a filter for trapping substantially all of the solid animal excrement from the flushing water and filtering out a substantial portion of the liquid from the excrement, and a storage area for storing solid animal excrement. The process further includes mixing a lime-cellulose composition into the separated animal excrement solids held in the storage area, and removing this treated animal excrement from the storage area for use as fertilizer after a relatively short period of time.

The drainage system is preferably provided in the floor 17 of the dairy barn and comprises a main drainage ditch 19 and several branch ditches 21 (four as illustrated in the drawings) that lead into the main ditch. These ditches 19 and 21 are generally semi-cylindrically shaped in cross section and, for a concrete floor, are preformed therein. Typically, the floor 17 of the dairy barn 11 is cleaned at least daily to remove the animals' excrement. For each cleaning and depending on the number of cattle, approximately 1,000 gallons of flushing water is used to wash the excrement into the branch ditches 21. For larger livestock operations, more flushing water may be required. The resultant waste water containing the flushing water and suspended particulate excrement is approximately 96% water and 4% solids by volume. This waste water is routed by the drainage system from the branch ditches 21 to the main ditch 19, which leads to a filtration system, generally designated 23. It is to be understood that the waste water may range from approximately 75% water and 25% solids by volume to approximately 99% water and 1% solids by volume and the process of the present invention will be effective in filtering the solid waste from waste water. Waste water with a solid content greater than 25% by volume (i.e., a slurry) may be too thick to adequately flow in the drainage system and through the filter assembly.

It is to be understood that drainage systems other than the above-described system may be used for transferring the animals' excrement to the filtration system without departing from the scope of the present invention. For example, the floor of the barn may have a number of grates that allow the animals' waste to pass through to a holding pit, which may then be flushed by water. Further, it should be noted that for some applications of the present invention where the waste has a relatively low moisture content, such as with poultry litter (approximately 15–20% moisture content), no filtration is required and the present invention is realized by mixing the deodorizing composition described hereinafter with the litter. Further, it is to be understood that the description of the livestock building as a dairy barn is purely for illustrative purposes as the process for treating excrement is just as effective for other livestock buildings for holding swine, chicken, beef cattle, etc. Furthermore, the process of treating the excrement can be used on any animal waste (including human waste).

As illustrated, the filtration system 23 comprises a filter assembly 27 and an elongate flume 25 for conveying waste water deposited therein at an end 40 of the flume 25 from the drainage system through the in-line filter placed within the flume. For this purpose, the flume 25 is preferably sloped downwardly approximately 3° from end 40 in which the waste water is deposited to an end 42 downstream of the filter. A drain 31 is located at end 42 of the flume 25 and leads the filtrate to a holding tank (not shown) or lagoon (not shown) depending on the operation of the user for later reuse as flushing water.

The filter assembly 27 comprises a filter medium 44 and a housing 46 for containing the filter medium. The filter housing 46 is preferably constructed of a rigid material such as concrete or plastic and comprises a pair of longitudinally spaced plates; a front plate 33 having a plurality of small openings 35 therein for passage of the waste water therethrough and into the filter, and a longitudinally spaced rear plate 34 having a plurality of small openings 36 therein for allowing the passage of the liquid waste water (the filtrate) therethrough. Preferably, the openings of the front and rear plates have a U.S. standard sieve Size in the range between 26.9 mm. (1.050 in. Tyler designation) and 37 microns (400 mesh Tyler designation). More preferably, the openings of the front and rear plates have a U.S. standard sieve size in the range between 11.2 mm. (0.441 in. Tyler designation) and 1.41 mm. (10 mesh Tyler designation). Most preferably, the openings of the front and rear plates have a U.S. standard sieve size in the range between 8 mm. (2½ mesh Tyler designation) and 4.76 mm. (4 mesh Tyler designation). The spaced front and rear plates 33, 34 and walls of the flume 25 define an interior 50 for the filter housing 46. The front and rear plates 33, 34 of the filter housing 46 are joined by a hinged perforated plate 48 which covers the interior 50 of the filter assembly 27. This plate can be pivoted to an open position to permit the introduction and removal of the filter medium.

Figure 3:
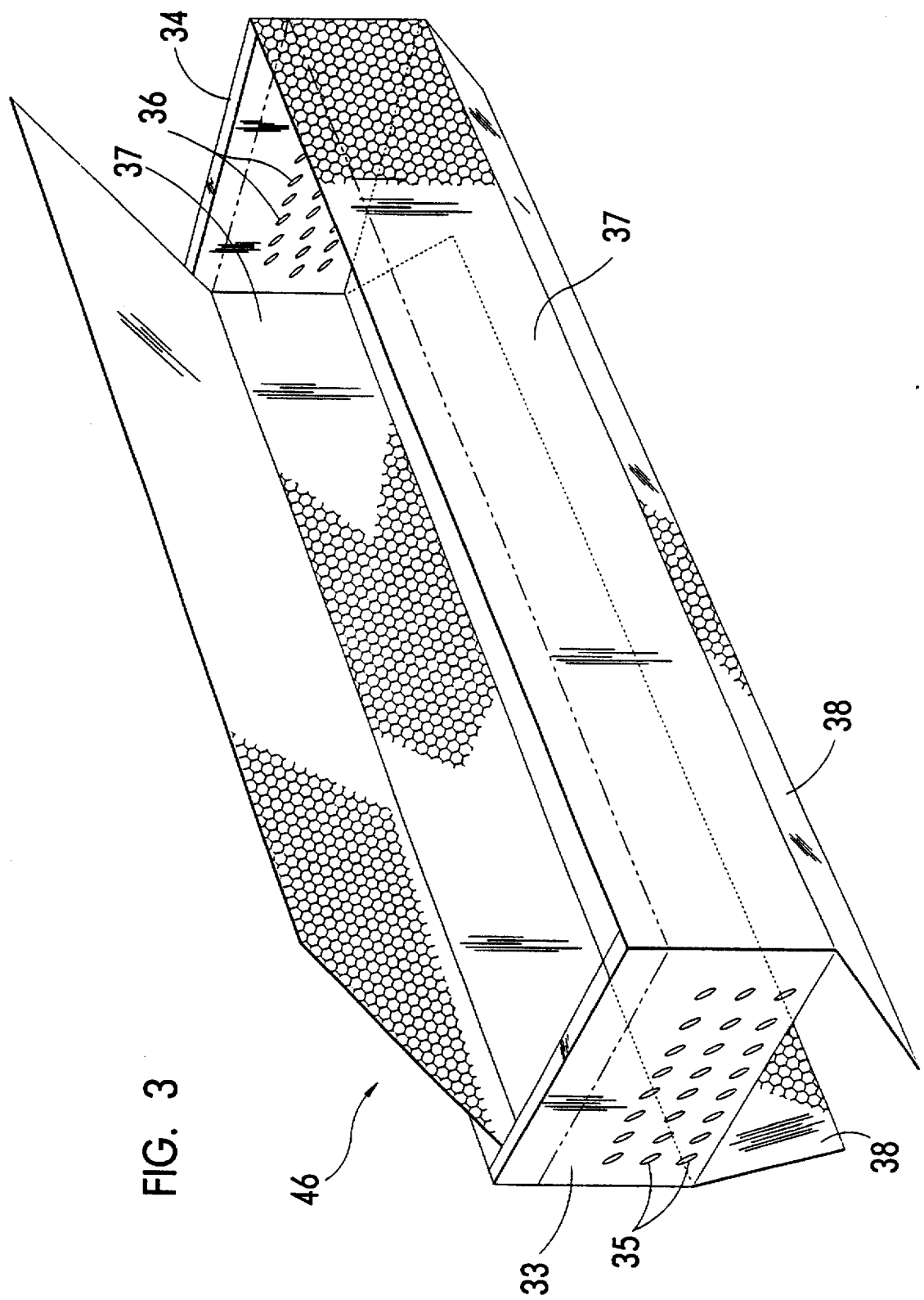
FIG. 3 is a perspective view of an alternative embodiment of a filter housing of the present invention.

It is to be understood that the filter housing 46 can be of many different configurations without departing from the scope of the present invention. In an alternative embodiment of the filter housing shown in FIG. 3, the housing further includes a pair of side walls 37 and a perforated bottom wall 38 extending between the front and rear plates 33, 34 to define the interior 50 of the housing. The perforated bottom wall 38 includes two members, each hingedly connected to a side wall 37 of the housing 46 for selectively opening the bottom to facilitate the removal of the excrement and saturated filter medium. This bottom-dump embodiment of the filter housing 46 is sized to fit snugly within the flume 25 of the filtration system.

The filter medium 44 is placed into the interior 50 of the filter housing 46 and preferably comprises a triturated cellulosic material (e.g., shredded or ground paper). The size of the triturated cellulosic material may vary in size from 3" square to approximately ⅟₁₆" square depending on the size of the openings in the filter housing (i.e., the size of the filter medium must be larger than the openings in the filter housing). It will be understood that the filter medium my be of many different sizes and configurations and may include a solid filter, a single or multi-sheet filter, and/or a canister-type filter without departing from the scope of the present invention. The filter medium 44 captures a substantial portion of solid excrement as the liquid excrement and flushing water flow therethrough. The amount of the triturated cellulosic material placed in the filter housing 46 and the number of flushings before this filter medium must be replaced varies depending upon the size of the livestock operation and the size and type of cellulosic material. Typically, the amount of triturated cellulosic material required to adequately filter the waste water in a single flush ranges from approximately 1 part by weight cellulose to 16 parts to 264 parts by weight waste water. Most preferably, the amount of cellulosic material required to adequately filter the waste water in a single flush is 1 part by weight cellulose to 32 parts by weight waste water.

Depending on numerous factors—such as the amount of and size of the triturated cellulose, the amount and size of excrement—the triturated cellulosic material filters approximately 90%–98% by weight of solids from the waste water and permits approximately 90%–95% by volume of the liquid portion to flow therethrough. The filter medium 44 is replaced when the cellulosic material is saturated and no longer effectively filters the solid excrement from the waste water. In the preferred embodiment, the filter medium 44 is replaced after approximately 4–6 flushes (i.e., every 2 or 3 days) depending on the conditions.

In the illustrated embodiment, there are two filters provided in the flume 25 designated 27A and 27B from top to bottom as viewed in FIG. 1. It is to be understood any number of filter assemblies may be used or filter assemblies of many other configurations may be used to filter the waste water depending on the size of the livestock operation and the amount of flushing water. In a multi-filter filtration system, small particulates of the solid excrement, which may have passed through the first filter assembly, may be trapped by the second or third filter assemblies, for instance, which would be equipped with a filter medium 44 configured to trap smaller particulates than the filter medium of the first filter assembly (i.e., the filter medium would be configured to progressively trap smaller particulates in multi-filter filtration systems).

The waste water is routed into the filter assembly 27 of the filtration system 23 by the flume 25 and the filter medium 44 traps a substantial portion of the solid excrement of the waste water. The liquid portion of the waste water (i.e., liquid excrement and water) flows through the filter assembly 27 to the other end 42 of the flume 25. Preferably, the filter assemblies are configured to provide a flow rate of waste water through the filtration system of at least 50 gpm (gallons per minute) in the first flush. More preferably, the filter assemblies are configured to provide a flow rate of waste water through the filtration system of at least 167 gpm in the first flush. Most preferably, the filter assemblies are configured to provide a flow rate of waste water through the filtration system of at least 500 gpm in the first flush. The flow rate through the filter will decrease upon subsequent flushes of the livestock building due to the increased density of the filter medium. As the waste water flows into the interior 50 of the filter housing 46, the cellulose 44 expands and floats therein. The holes of the perforated plate 48 are sized to be smaller than the triturated cellulose material and thus the perforated plate contains the cellulose material within the housing. During high volumetric flow of the waste water, the perforated cover plate 48 permits the filtrate to, in effect, overflow the filter housing 46 by passing through the perforated plate covering the interior of the housing and over the filter housing. Preferably, the perforated plate has the same U.S. standard sieve size as the front and rear plates 33, 34.

The filtrate flows from the filter assembly 27 to the drain wherein it is routed to a lagoon or storage tank for reuse as flushing water. The filtrate has substantially all of the animal excrement solids removed therefrom resulting in considerable reduction of foul odor emitted from the lagoon. Further, the relatively clean filtrate may be held in a storage tank for reuse as the flushing water. As desired, the filtrate in the storage tank can be pumped therefrom for reuse as flushing water.

After the cellulosic material 44 is saturated and the waste water is blocked from entering the filter, the animal excrement mixture containing the solid animal excrement and the filter medium (i.e., the cellulose material) is removed from the filter housing 46 and transferred to a mixer (not shown). This is done by removing the perforated plate 48 and scooping the animal excrement mixture 44 from the flume 25, as by a front loader, and delivering it to the mixer. In the alternative embodiment of the filter housing, described previously, the housing 46 is removed from the flume 25 and the animal excrement mixture is dumped into the mixer by pivoting the bottom wall 38 of this housing to its open position to permit gravitational dumping of the animal excrement mixture. The bottom wall 38 is then closed and the filter housing 46 positioned in the flume is resupplied with a new filter medium 44. The perforated cover plate 48 is placed on the filter housing and secured thereto and the filter assembly is thus prepared for the next flush. It should be noted that any system may be used to offload the trapped solid excrement and filter medium from the filter housing, such as an auger placed in the filter housing, without departing from the scope of the present invention.

The animal excrement mixture has a moisture content as dumped in the mixer varying between approximately 15%–97%. In the mixer, this wet mixture is treated with a deodorizing composition, which acts to deodorize the excrement and increase the surface area for evaporation of moisture from the excrement mixture. The deodorizing composition contains between about 5 percent to about 90 percent by weight of lime and about 10 percent to about 95 percent by weight of cellulose. This composition is added to the animal excrement mixture in the mixer. Preferably, the composition contains about 35 to 50 percent by weight of lime and about 50 to 65 percent by weight of cellulose. Most preferably, the composition contains about 37 percent by weight of lime and about 63 percent by weight of cellulose.

The lime consists of calcium oxide that is obtained by calcining forms of calcium carbonate (e.g., shells or limestone), and is commonly referred to as "caustic lime." The cellulose used to produce the composition may be obtained from used paper products such as newsprint or computer paper. As an alternative, cellulose may also be obtained from waste bi-products such as tree pulp, soybean stalks, corn stalks, peanut vines and hulls, and waste vegetables, for example. Preferably, the cellulose is shredded or ground to a small size for better blending with the lime. A hammer mill is especially suited for performing this function. The lime may be blown into the shredded newsprint as it is shredded for better mixture of the cellulose and lime.

The composition is mixed into the animal excrement mixture in a relative range of approximately 1 part by weight composition to approximately 1 to 20 parts by weight animal excrement mixture (wet weight) to produce a treated animal excrement mixture. More preferably, the composition is mixed with the animal excrement mixture in a relative proportion of about 1 part by weight composition to about 3 to 10 parts by weight animal excrement mixture (wet weight) to produce a treated animal excrement mixture. Most preferably, the composition is mixed with the animal excrement mixture in a relative proportion of about 1 part by weight composition to about 5 to 8 parts by weight animal excrement mixture (wet weight) to produce a treated animal excrement mixture. With the latter or most preferred proportion, the relative proportion of composition and animal excrement mixture by volume are approximately equal.

This treated animal excrement mixture is preferably removed from the mixer and brought to a storage area, such as a stackhouse, for dehydration and chemical reaction. It will be noted that the treated animal excrement mixture can be dehydrated in the mixer, outside or in any storage facility. The compound functions to substantially deodorize the treated animal excrement mixture, increase the alkalinity of the animal excrement mixture and increase the surface area for evaporation of the water from the treated animal excrement mixture. The absorption of water by the composition provides a greater surface area over which the water may be evaporated thereby decreasing the time required to dry the treated animal excrement mixture so that it may be removed from the storage area and used or sold as fertilizer. Further, it is believed that this quick drying and chemical reaction substantially reduces the odor produced by the excrement.

Preferably, a small amount of boron is added to the composition. As shown in U.S. Pat. No. 943,668, boron is beneficial to soil as a micro-nutrient in that it neutralizes acidic soil. Boron is also a natural fire retardant and aids in protecting the composition from combusting during storage in the holding area. The boron is added in a proportion of 1 part by weight boron to between approximately 3000–3500 parts by weight treated animal excrement, most preferably 3078 parts by weight treated animal excrement. It will be noted in this regard that other micro-nutrients beneficial to the soil, such as magnesium, may be added to the composition to create a custom mix for the user needs.

Depending on the needs of the user, a metal pickling waste may be mixed with fine sawdust to produce a fine granular mixture and added to the compound. The pickeling waste is an inorganic acid (e.g., sulfuric, hydrochloric, or phosphoric) and is highly acidic (ph: 2.0–2.3). The granular mixture of the waste and fine sawdust can be used to control the alkalinity of the resulting fertilizer. Thus, a custom mix meeting the specific requirements of the user can be prepared.

It has been found that the treated animal excrement is substantially dehydrated, i.e., capable for use as fertilizer, within 48 hours, and in most instances, depending upon the relative humidity conditions, within 24 hours. Applicant believes that better aeration of the excrement due to the composition and filter medium enables the quick dehydration of the excrement. Once the fertilizer mixture is sufficiently dehydrated, it may be removed (as by a scoop loader) from its respective storage area and field applied, or sold as fertilizer. The field-applicable fertilizer is obtained in a substantially reduced amount of time, is substantially deodorized and due to the substantial dehydration of the mix, less waste water run-off is obtained and ground-water contamination is greatly reduced.

The present invention is illustrated by the following examples which is merely for the purpose of illustration and is not to be regarded as limiting the scope of the invention or manner in which it may be practiced.

EXAMPLE 1

Samples of the deodorizing composition of the present invention were prepared with varying complementary proportions of lime and cellulose, as illustrated in Table 1.

Samples of treated animal excrement mixtures were prepared by mixing the sample compositions identified in Table I mixed with animal excrement (chicken manure). Summarized in Table II are the mixtures comprising varying complementary proportions of composition and excrement.

TABLE I

| SAMPLE | 1 | 2 | 3 | 4 | 5 | 6 | 7 |
|---|---|---|---|---|---|---|---|
| weight (lbs.) composition | 4.16 | 3.54 | 3.09 | 2.77 | 2.50 | 2.28 | 3.16 |
| wt. % of lime in composition | 52.41 | 52.82 | 52.75 | 52.35 | 52.40 | 52.19 | 37.60 |
| wt. % of cel. in composition | 47.59 | 47.18 | 47.25 | 47.65 | 47.60 | 47.81 | 62.40 |

TABLE II

| SAMPLE | 1 | 2 | 3 | 4 | 5 | 6 | 7 |
|---|---|---|---|---|---|---|---|
| Total wt. mixture (lbs.) | 25.00 | 24.94 | 24.99 | 24.99 | 25.00 | 25.08 | 25.00 |
| Wt. % of lime in mixture | 8.70 | 7.50 | 6.52 | 5.80 | 5.24 | 4.74 | 4.76 |
| Wt. % of cel. in mixture | 7.90 | 6.70 | 5.84 | 5.28 | 4.76 | 4.35 | 7.90 |
| Wt. % of excr. in mixture | 83.40 | 85.81 | 87.64 | 88.91 | 90.00 | 90.91 | 87.34 |

Summarized in Table III are the results of an analysis of the samples identified in Table II, the analysis being conducted approximately twenty-four hours after the samples of compositions were mixed with the samples of excrement. A 25 lb. sample of untreated chicken manure was also analyzed after approximately twenty-four hours. Results of this analysis are listed in Tables IV.

TABLE III

| SAMPLE | 1 | 2 | 3 | 4 | 5 | 6 | 7 |
|---|---|---|---|---|---|---|---|
| Wt. % of water in mixture | 64.83 | 66.13 | 68.01 | 68.53 | 69.93 | 69.63 | 67.74 |
| Wt. % of protein in mix. | 5.02 | 5.76 | 5.77 | 5.16 | 3.82 | 4.79 | 4.94 |
| Wt. % of N in mixture | 0.80 | 0.92 | 0.92 | 0.82 | 0.61 | 0.77 | 0.79 |
| Wt. % of Ca in mixture | 5.06 | 4.78 | 4.45 | 4.34 | 4.33 | 4.10 | 4.03 |
| Wt. % of P in mixture | 0.52 | 0.53 | 0.51 | 0.54 | 0.64 | 0.60 | 0.57 |
| Wt. % of Mg in mixture | 0.13 | 0.13 | 0.14 | 0.14 | 0.15 | 0.16 | 0.14 |
| Wt. % of K in mixture | 0.57 | 0.58 | 0.57 | 0.57 | 0.69 | 0.68 | 0.64 |
| Wt. % of Na in mixture | 0.15 | 0.16 | 0.14 | 0.15 | 0.17 | 0.17 | 0.17 |
| Wt. % of S in mixture | 0.25 | 0.21 | 0.16 | 0.17 | 0.17 | 0.16 | 0.23 |
| Fe conc. in mixture (PPM) | 376 | 359 | 368 | 365 | 355 | 361 | 390 |
| Cu conc. in mixture (PPM) | 11 | 11 | 11 | 11 | 12 | 12 | 13 |
| Mn conc. in mixture (PPM) | 116 | 108 | 109 | 113 | 126 | 125 | 126 |
| Zn conc. in mixture (PPM) | 73 | 73 | 77 | 77 | 92 | 91 | 85 |
| pH | 8.90 | 8.90 | 8.60 | 8.40 | 8.10 | 8.10 | 8.80 |

TABLE IV

| SAMPLE | 1 |
|---|---|
| Wt. % of water in mixture | 77.84 |
| Wt. % of N in mixture | 0.79 |
| Wt. % of Ca in mixture | 2.32 |
| Wt. % of P in mixture | 0.65 |
| Wt. % of Mg in mixture | 0.15 |
| Wt. % of K in mixture | 0.67 |
| Wt. % of Na in mixture | 0.17 |
| Wt. % of S in mixture | 0.07 |
| Fe conc. in mixture (PPM) | 301 |
| Cu conc. in mixture (PPM) | 12 |
| Mn conc. in mixture (PPM) | 118 |
| Zn conc. in mixture (PPM) | 120 |
| pH | 7.60 |

As illustrated by the results shown above and as previously mentioned, it is desirable that the treated samples possess relatively high amounts of minerals that benefit the soil. More particularly, it is desirable that this process for treating the animal excrement does not reduce the amounts of nitrogen (N), phosphorus (P) and potassium (K), otherwise referred to as an "N—P—K index," which were present in the animal excrement before it was treated. As illustrated above in Tables II and III, the treated samples, as a whole, have roughly equivalent values of these important minerals as compared to the untreated sample. For example, the average weight percentage of nitrogen of the seven samples is 0.80% and the weight percentage of nitrogen of the untreated sample was 0.79%. Thus, it will be observed that the composition of the present invention is capable of deodorizing the animal excrement without losing important minerals which should be present in the fertilizer.

Another advantageous benefit to treating the animal excrement with the composition is that the relatively low alkalinity value of the untreated excrement (i.e., pH of 7.6) is greatly increased to a higher alkalinity value (i.e., pH between 8.10 and 8.90). This is beneficial since the resultant fertilizer will neutralize acidic soil.

Further, the treated animal excrement mixture has a lower moisture content per pound of material (approximately 8 to 13% lower by weight in the example shown above) than untreated manure. However, it is to be understood that the moisture content per pound of material may be significantly more reduced depending on the nature of the composition and animal excrement. It was also observed that the treated animal excrement mixture was significantly less malodorous than the untreated sample. It is believed that both the quick evaporation of the moisture in the manure due to the increased surface area and the chemical reaction of the lime mixing with the manure aids in the dissipation of its odor.

EXAMPLE 2

Samples of waste water were taken before and after filtration through the filtration system of the present invention. Summarized in Table V are the results of an analysis of the samples.

TABLE V

| Samples | 1 | 2 |
| --- | --- | --- |
| Hydrogen Sulfide conc. in sample (mg/L) | 96.0 | <1.0 |
| Potassium conc. in sample (mg/L) | 807 | 819 |
| Ammonia conc. in sample | 1421 | 1369 |
| Sulfate conc. in sample | 162 | 91.4 |
| Total Phosphorous conc. in sample | 147 | 64.0 |

As previously mentioned, it is desirable that the filtrate, which is typically routed to a holding lagoon for reuse, possesses relatively low levels of hydrogen sulfide, which is malodorous. As illustrated by the results shown above, the filtration system of the present invention removed substantially all of the hydrogen sulfide from the waste water resulting in a much less malodorous filtrate.

In view of the above, it will be seen that the several objects of the invention are achieved and other advantageous results attained.

As various changes could be made in the above processes and compositions without departing from the scope of the invention, it is intended that all matter contained in the above description as shown in the accompanying drawing shall be interpreted as illustrative and not in a limiting sense.

What is claimed is:

1. A process for the treatment of animal excrement which has collected in an enclosure housing animals comprising the steps of:

flushing the enclosure housing animals to produce a stream containing water and suspended particulate excrement, passing the stream through a filtration system comprising at least one filter having a filter medium for trapping substantially all of the solid animal excrement and filtering liquid from the excrement to produce an animal excrement mixture containing the solid animal excrement and the filter medium;

mixing the animal excrement mixture with a deodorizing composition comprising about 5 percent to about 90 percent by weight of lime and about 10 percent to about 95 percent by weight of cellulose, the deodorizing composition being mixed with the animal excrement mixture in a relative proportion of about 1 to 20 parts by weight animal excrement mixture to about 1 part by weight composition to produce a treated animal excrement mixture; and drying the treated animal excrement mixture.

2. A process as set forth in claim 1 wherein the deodorizing composition comprises about 35 percent to about 50 percent by weight of lime and about 65 percent to about 50 percent by weight of cellulose.

3. A process as set forth in claim 2 wherein the deodorizing composition comprises about 37 percent by weight of lime and about 63 percent by weight of cellulose.

4. A process as set forth in claim 3 wherein the filter medium is made of cellulose.

5. A process as set forth in claim 4 wherein the deodorizing composition is mixed with the animal excrement mixture in a relative proportion in the range of about 2 to 20 parts by weight animal excrement mixture to about 1 part by weight deodorizing composition.

6. A process as set forth in claim 5 wherein the deodorizing composition is mixed with the animal excrement mixture in a relative proportion in the range of about 3 to 10 parts by weight animal excrement mixture to 1 part by weight deodorizing composition.

7. A process as set forth in claim 1 wherein the filter medium is made of cellulose and wherein the deodorizing composition is mixed with the animal excrement mixture in a relative proportion in the range of about 2 to 20 parts by weight animal excrement mixture to about 1 part by weight deodorizing composition.

8. A process as set forth in claim 7 wherein the composition is mixed with the animal excrement mixture in a relative proportion in the range of about 3 to 10 parts by weight animal excrement mixture to 1 part by weight deodorizing composition.

9. A process as set forth in claim 1 wherein the deodorizing composition further comprises boron.

10. A process as set forth in claim 1 wherein the deodorizing composition further comprises a pickling waste.

11. A process as set forth in claim 1 wherein the treated animal excrement mixture is substantially dehydrated within 48 hours.

12. A process as set forth in claim 11 wherein the treated animal excrement is substantially dehydrated within 24 hours.

13. The process of claim 1 wherein the cellulose comprises shredded newspaper.

14. The process of claim 13 wherein the lime is mixed with the newspaper during the shredding of the newspaper.

* * * * *